United States Patent Office 3,346,780
Patented Oct. 10, 1967

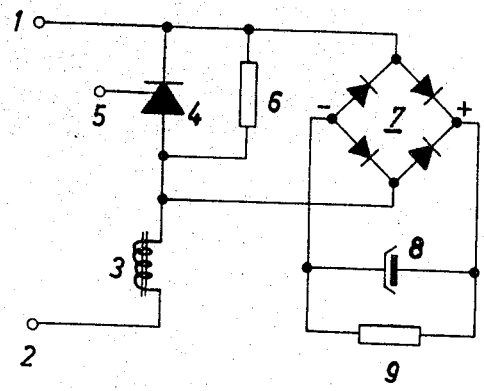

3,346,780
CONTROLLABLE SUPPLY OR FEED CIRCUIT FOR ELECTROMAGNETIC VIBRATORS
Uwe Klix, Rottweil, Germany, assignor to Entwicklungsanstalt für Industrie-Elektronik, Schaan, Liechtenstein, a corporation of Liechtenstein
Filed Jan. 4, 1965, Ser. No. 423,240
Claims priority, application Switzerland, Feb. 13, 1964, 1,734/64
7 Claims. (Cl. 317—148.5)

ABSTRACT OF THE DISCLOSURE

A controllable alternating current supply circuit for electromagnetic vibrators including a driving circuit comprising a controlled semiconductor rectifier connected in series with the vibrator coil across a source of supply. A voltage-limiting circuit is placed in parallel with the controlled rectifier, the voltage-limiting circuit comprising a full-wave rectifier-bridge with a parallel resistance-capacitance filter connected across the direct current side of the rectifier-bridge. Resistance means are provided across the controlled rectifier dimensioned such that a leakage or bypass current will flow in the driving circuit even when the controlled rectifier is in the blocking state. Current build-up through the vibrator coil subsequently takes place with a reduced inductive time delay when the controlled rectifier is switched on as the driving current does not commence from a null or zero value.

---

The present invention has reference to an improved controllable supply or feed circuit for electromagnetic vibrators.

Electromagnetic vibrators as such have found application for the drive of conveyer troughs, dosing units, charging devices and so forth, are supplied by an alternating-current network through the agency of a half-wave rectifier. In so doing, it is known to use a controlled semiconductor rectifier for most of the required stepless power regulation between zero and maximum power, wherein the functions of the control element and the rectifier are combined. Due to its small dimensions, readiness for immediate operation and low voltage drop the controlled rectifier distinguishes itself from the control elements previously employed in conjunction with electromagnetic vibrators, such as potentiometers, regulating transformers, thyratrons or magnetic amplifiers. Generally speaking, in this environment the controlled rectifier is connected in series with the vibrator coil, power regulation occurring through circuit impulses (starting impulses) applied to the control electrode of the rectifier. Such impulses are synchronized with the frequency of the network, however, are variable with regard to phase position (power control by controlling the point of ignition of the controlled rectifier).

However, during practical application of the controlled semiconductor rectifier for this purpose, a number of different difficulties arise, which, up to the present, have not been able to be completely overcome. Above all, the controlled semiconductor rectifier is endangered by excessive voltages occurring during operation. On one hand, short excessive peak voltages are oftentimes superimposed upon the supply network. They are brought about by switching-in transformers, motors, compensating capacitors and so forth. However, in the circuit itself excessive peak voltages are also produced which are governed by the particular characteristics of the controlled rectifier in conjunction with the inductivity of the vibrator coil. After the rectifier has been placed into a conducting state each time by means of a starting impulse applied to the control electrode during each cycle, it does not return to the blocking or non-conducting condition with the next zero crossover, rather upon falling below a finite forward current, the so-called holding current. Due to this current, the vibrator coil is switched-off during each cycle. Tripping back of the rectifier takes place within a few microseconds, and even though the holding current only amounts to approximately 0.05 to 0.1 ampere there appear considerable excessive peak voltages which influence the rectifier in the blocking or high-resistance direction.

Consequently, during periodic switching-in of the controlled rectifier difficulties arise by virtue of the high inductivity of the vibrator coil. Beginning with the starting impulse, the current climbs only in accordance with the time-constant $L/R$ of the current circuit. Whenever the value of the mentioned holding current has still not been reached after disappearance of the starting impulse, then the rectifier immediately trips back again into its non-conducting or blocked condition. Ignition and as a result an appreciable current flow through the vibrator then does not occur at all.

Accordingly, it is a primary object of the present invention to design an improved controllable supply circuit of the mentioned type for electromagnetic vibrators which completely overcomes the previously described difficulties.

Characteristic of the inventive supply circuit is the feature that the controlled rectifier, on the one hand, is bridged by an ohmic resistance and, on the other hand, by a voltage-limiting current branch circuit.

Other features, objects and advantages of the present invention will become more readily apparent by referring to the following detailed description and drawing, where the single figure depicts a circuit diagram of an advantageous embodiment of the inventive controllable supply circuit for electromagnetic vibrators.

Describing now the single figure, it will be understood that the supply circuit is connected between the terminals 1 and 2 of an alternating-current supply network. A controlled semiconductor rectifier 4 serving as control element for power regulation or control of the vibrator drive is connected in series with the vibrator coil 3. In known manner a non-illustrated impulse source is connected to the control electrode 5 of the semiconductor rectifier 4, the impulses being synchronized with the frequency of the supply network, yet are adjustable in phase relation. These impulses bring about periodic starting or ignition of the rectifier 4 which again trips back into its blocking state upon subsequently falling below its holding current. In this way power flowing through the vibrator coil 3 is regulated in the manner of controlling the ignition point of the controlled rectifier by changing the phase relationship of the starting impulse at the control electrode 5.

A resistor 6 is connected in parallel with the controlled semiconductor rectifier 4. This resistor 6 renders easier temporary ignition of the rectifier 4 in a manner which will be described more fully hereinafter. Additionally, the controlled rectifier 4 is bridged by a voltage-limiting current branch circuit. This current branch circuit incorporates a full-wave rectifier bridge 7. A capacitor 8 of relatively large capacitance is connnected to the direct-current side of the rectifier arrangement or bridge 7. This capacitor 8 in turn is bridged by a discharge resistor 9.

The mode of operation of the illustrated circuit is as follows:

As mentioned, during operation the intervals during which the controlled rectifier 4 is conductive periodically change with such intervals during which the aforesaid rectifier blocks, wherein the time relationship or ratio of such intervals with respect to one another is dependent upon the phase position of the control impulse at the control electrode 5. As long as the controlled rectifier 4 temporarily still blocks there already flows a certain current of limited or small strength through the vibrator coil 3 and the resistor 6 bridging the controlled rectifier 4. The resistor 6 is dimensioned so large that this current at best approximately reaches the order of magnitude of the holding current of the controlled rectifier 4. This low current intensity does not yet bring about any deflection of the vibrator. At the beginning of a starting impulse at the control electrode 5 the resistance of the controlled rectifier 4 momentarily drops considerably below the value of the resistor 6, and the previously mentioned holding current now flows immediately through the controlled rectifier 4 instead of through the resistor 6. Consequently, there is achieved that at the beginning of the starting impulse the controlled rectifier 4 is passed right at the start by a current which corresponds to the holding current of the controlled rectifier 4 or at least approaches such holding current. As a result, there is achieved faultless ignition and tripping of the controlled rectifier 4 into its conducting state also during short ignition intervals, that is, in the range of low vibrator power. Without the feature of a resistor 6 connected in parallel with the controlled rectifier 4, in each case after the beginning of a starting impulse the current through the controlled rectifier 4 starting from null would first have to build-up in a highly inductive current circuit, which would lead to the previously mentioned difficulties and delay in ignition. Consequently, the parallelly connected resistor 6 provides a very simple and reliable means for overcoming the mentioned difficulties with a not too high rated power of the vibrator.

The additional current branch circuit which is connected in parallel to the controlled rectifier 4 and incorporates the rectifier bridge 7 provides for effective protection of the controlled rectifier 4 against excessive voltages. During operation the capacitor 8 is charged to the network peak voltage via the full-wave rectifier bridge 7. Upon the appearance of an excessive peak voltage a corresponding considerable charging current flows in the capacitor 8, whereby, however, during the short duration of the voltage peak the capacitor voltage only increases an amount which is not critical due to the large capacitance of the aforesaid capacitor 8. After the decay of the excessive voltage the capacitor 8 discharges through the leakage resistor 9 again to the network peak voltage. The voltage of the capacitor 8 automatically adjusts to the usual, relatively slow oscillations or fluctuations of the network voltage. This protective circuit responds particularly favorably against cut-in or starting surges during placing the system into operation, since then the capacitor 8 is initially completely discharged.

The described voltage-limiting current branch circuit embodies only conventional, commercially available and, therefore, inexpensive circuit components, the dimensions of which are not critical.

On the other hand, a similar protective action or effect can also be achieved with a different voltage-limiting current branch circuit bridging the controlled semiconductor rectifier 4. Thus, for example, there can be employed two series connected semiconductor diodes having breakdown or avalanche characteristics and which are connected in opposition with respect to one another. Diodes suitable for this purpose are Zener-diodes or Avalanche-diodes, or those commercially available semiconductor diodes sold under the trademark "Tyrector." With the selection of diode types having suitable breakdown or avalanche voltage the voltage through such a current branch circuit and thereby through the controlled semiconductor rectifier 4 is limited to a value which cannot damage or become dangerous for the rectifier. In my co-pending United States application, Ser. No. 421,521, filed Dec. 28, 1964, and entitled "Controllable Supply Circuit for Electromagnetic Vibrators" there is disclosed a voltage-limiting branch circuit using such "self-protecting" diodes, and reference may be readily had thereto.

At any rate, the dimensioning of such special diodes with respect to the breakdown voltage is critical to some extent, since with small increase of the network voltage the diodes should still block or be non-conductive.

While there is shown and described a present preferred embodiment of the invention, it is to be distinctly understood that the invention is not limited thereto but may be otherwise variously embodied and practiced within the scope of the following claims.

What is claimed is:

1. Controllable alternating current supply circuit for electromagnetic vibrators comprising a vibrator coil, a controlled semiconductor rectifier connected in series with said vibrator coil, an ohmic resistor bridging said controlled semiconductor rectifier, and a voltage-limiting branch circuit bridging said controlled semiconductor rectifier.

2. Controllable alternating current supply circuit for electromagnetic vibrators as defined in claim 1 wherein said resistor is dimensioned so large that the current temporarily flowing through said resistor towards the end of a blocking interval of said controlled semiconductor rectifier at most reaches the order of magnitude of the holding current of said controlled semiconductor rectifier.

3. Controllable alternating current supply circuit for electromagnetic vibrators as defined in claim 1 wherein said voltage-limiting branch circuit contains a full-wave rectifier bridge, a capacitor connected to the direct-current side of said full-wave rectifier bridge, a discharge resistor bridging said capacitor.

4. Controllable alternating current supply circuit for electromagnetic vibrators comprising a vibrator coil, a controlled semiconductor rectifier connnected in series with said vibrator coil, a resistor bridging said controlled semiconductor rectifier, and a voltage-limiting branch circuit bridging said controlled semiconductor rectifier and said resistor.

5. A controllable alternating current supply circuit for electromagnetic vibrators comprising:
a vibrator coil;
a driving circuit including a controlled semiconductor rectifier having a predetermined holding current level, said controlled semiconductor rectifier being connected in series with said vibrator coil across a source of supply voltage;
means connected in parallel with said controlled semiconductor rectifier for limiting the peak voltage across said controlled semiconductor rectifier; and
current shunting means connected in parallel with said controlled semiconductor rectifier, said current shunting means allowing current flow in said driving circuit when said controlled semiconductor rectifier is in a blocking state, said current flow being limited to said holding current level; whereby subsequent current buildup through said vibrator coil when said controlled semiconductor rectifier is in a conducting state occurs substantially without delay.

6. A controllable alternating current supply circuit for electromagnetic vibrators according to claim 5, wherein said current shunting means comprises an ohmic resistor.

7. A controllable alternating current supply circuit for electromagnetic vibrators according to claim 6, wherein said peak voltage limiting means comprises a full-wave bridge rectifier having a pair of input terminals and a pair of output terminals, said input terminals being connected across said controlled semiconductor rectifier; a filter circuit including an ohmic resistor and a capacitor connected in parallel, said filter circuit being connected across said output terminals.

References Cited
UNITED STATES PATENTS

| | | | |
|---|---|---|---|
| 2,758,254 | 8/1956 | Kramer | 317—11 |
| 2,991,396 | 7/1961 | Schurr | 317—11 |
| 3,113,293 | 12/1963 | Breese et al. | 340—50 |
| 3,122,690 | 2/1964 | Dion et al. | 318—132 X |

MILTON O. HIRSHFIELD, *Primary Examiner.*

LEE T. HIX, *Examiner.*

J. A. SILVERMAN, *Assitant Examiner.*